US006934942B1

(12) United States Patent
Chilimbi (10) Patent No.: US 6,934,942 B1
(45) Date of Patent: Aug. 23, 2005

(54) SYSTEM AND METHOD FOR USING DATA ADDRESS SEQUENCES OF A PROGRAM IN A SOFTWARE DEVELOPMENT TOOL

(75) Inventor: Trishul M. Chilimbi, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 457 days.

(21) Appl. No.: 09/939,162

(22) Filed: Aug. 24, 2001

(51) Int. Cl.$^7$ ................................................ G06F 9/45
(52) U.S. Cl. ...................................................... 717/158
(58) Field of Search ................................ 717/151, 128, 717/109, 158; 707/104

(56) References Cited

U.S. PATENT DOCUMENTS

| | | | |
|---|---|---|---|
| 5,940,618 A | * | 8/1999 | Blandy et al. ............... 717/128 |
| 6,247,020 B1 | * | 6/2001 | Minard .................... 707/104.1 |
| 6,353,924 B1 | * | 3/2002 | Ayers et al. ................ 717/128 |
| 6,360,361 B1 | | 3/2002 | Larus et al. .................... 717/9 |

OTHER PUBLICATIONS

Srivastava et al., "Vulcan: Binary transformation in a distributed environment", Microsoft Research, MSR-TR-99-76, 1999.*
Ammons et al., "Exploiting Hardware Performance Counters with Flow and Context Sensitive Profiling", ACM PLDI '97 Las Vegas, NV. USA, 1997.*
Lebeck et al., "Cache Profiling and the SPEC Benchmarks: A case Study", IEEE computer, Jun. 1994.*
Larus et al., "EEL:Machine-Independent Executable Editing", Proceedings of the SIGPLAN '95 Conference on Programming Language Design and Implementation. La Jolla, CA, 1995.*
"DEADALUS: IMproving Data Locality and Scalability", Mircosoft Corp.*
Srivsastava et al., "ATOM:A System for Building Customized Program Analysis Tools", Digital Western Research Laboratory, Mar. 1994.*
"Binary Technologies Group (BIT)", Microsoft Corp.*
Nevill-Manning et al., "Compression and Explanation Using Hierarchical Grammars", *The Computer Journal*, vol. 40, No. 2/3, 1997, pp. 103-116.
Larus, "Whole Program Paths", *ACM Sigplan Notices*, vol. 34, No. 5, Atlanta, GA, May 1999, pp. 259-269.
Chilimbi et al., "Making Pointer-Based Data Structures Cache Conscious", *Computer*, vol. 33, No. 12, Dec. 2000, pp. 67-74.
Chilimbi, "Efficient Representations and Abstractions for Quantifying and Exploiting Data Reference Locality", *ACM Sigplan Notices*, vol. 36, No. 5, Snowbird, UT, Jun. 2001, pp. 191-202.
Chilimbi, "On the Stability of Temporal Data Reference Profiles", *International Conference on Parallel Architectures & Compilation Techniques*, Barcelona, Spain, Sep. 2001, pp. 151-160.

* cited by examiner

*Primary Examiner*—Tuan Dam
*Assistant Examiner*—Kuo-Liang J. Tang
(74) *Attorney, Agent, or Firm*—Merchant & Gould; Ryan T. Grace (57) ABSTRACT

A system and method for determining where bottlenecks in a program's data accesses occur and providing information to a software developer as to why the bottlenecks occur and what may be done to correct them. A stream of data access references is analyzed to determine data access patterns (also called data access sequences). The stream is analyzed to find frequently repeated data access sequences (called hot data streams). Properties of the hot data streams are calculated and upon selection of a hot data stream are displayed in a development tool that associates lines of code with the hot data streams.

26 Claims, 9 Drawing Sheets

SYSTEM AND METHOD FOR USING DATA ADDRESS SEQUENCES OF A PROGRAM IN A SOFTWARE DEVELOPMENT TOOL

FIELD OF THE INVENTION

The present invention relates generally to computer-executable software applications and, more particularly, to improving the performance of computer-executable software applications.

BACKGROUND

As processor speeds continue to increase, memories providing data to the processor have become more and more of a bottleneck. In an effort to speed memory access, high speed caches were created to deliver data to processors. Generally, a cache only stores a fraction of the data stored in main memory. A cache "hit" occurs when the cache contains data the processor is requesting. A cache "miss" occurs when the cache does not contain data the processor is requesting. When a cache miss occurs, the data must be retrieved from main memory or disk. The time to fetch the data when a cache miss occurs, even from main memory, can be much greater than when a cache hit occurs. Increasing the percentage of cache hits and decreasing the number of cache misses, therefore, increases the overall performance of a computer system.

One approach to increasing performance is through the use of optimizing compilers. While for certain kinds of optimizations, this works well, for other kinds of optimizations it provides little if any benefit. Optimizing compilers are typically poor, for example, at rewriting an inefficient algorithm.

Another approach to increasing performance is to profile an executing program. Profiling generates data about how long a program spends in each subroutine. Profiling tools may tell a programmer the percentages of time consumed in each subroutine of an executing program, but they fail to tell the programmer why the program spends the time it does in each subroutine. A programmer may unwittingly make changes that decrease program performance.

SUMMARY

The present invention provides a system and method for determining where bottlenecks in a program's data accesses occur and providing information to a software developer as to why the bottlenecks occur and what may be done to correct them. A stream of data access references is analyzed to determine data access patterns (also called data access sequences). The data references of the stream are transformed into Whole Program Streams (WPS). WPS are small compared to the raw data address traces and permit analysis without decompression. The WPS can then be used to efficiently discover higher-level data abstractions, such as hot data streams. Hot data streams may be viewed as frequently repeated sequences of consecutive data accesses. They serve as an effective abstraction for understanding and analyzing a program's dynamic data access behavior as well as exposing reference locality in a data address stream. The hot data streams are then associated with lines of code in a development tool to give a software developer better feedback as to a cause of the bottlenecks.

In one aspect of the invention, a list of identifiers associated with hot data streams are shown in a development tool. The development tool may be a visual development environment that integrates features useful for software development. The development environment may have a navigation tool that allows a user to browse hot data streams. When a hot data stream is selected, source code associated with the hot data stream is highlighted. When an object of the hot data stream is selected, source code associated with the object is further highlighted. This provides a software developer feedback regarding what source code causes (or previously caused) which hot data streams to be generated.

In another aspect of the invention, WPS are created by constructing a grammar from a stream of data access references. This grammar is then used to construct a candidate sequence of data references. If the cost of accessing data in the candidate sequence of data references exceeds a threshold, the candidate sequence is marked as a hot data stream.

In one aspect of the invention, a stream of data references that is analyzed comes from a trace file. In another aspect of the invention, a stream of data references that is analyzed comes from a currently executing program.

In another aspect of the invention, a system for developing computer-executable software is provided. The system includes an instrumentation tool, a trace analyzer, and a software development tool. In one aspect of the invention, these three components are integrated in a visual development environment. The software development tool may include a navigation feature for a user to browse and select hot data streams.

In another aspect of the invention, a trace analyzer analyzes traces by constructing a directed acyclic graph (DAG) of data accesses. The DAG is then used to identify hot data streams.

In another aspect of the invention, the development tool displays attributes associated with a hot data stream. Such attributes may include the number of times a data access sequence repeats in a stream, the number of data references in a data access sequence, the number of unique objects referenced in a data access sequence, the number of references in the stream between occurrences of the data access sequence, and a cache block packing efficiency of the data access sequence.

There are several advantages to the present invention, some of which follow. For example, it is not required to rely on system architecture to provide useful information. In other words, the invention can be practiced on various types of computers and operating systems, including personal computers, hand-held devices, multiprocessor systems, microprocessor-based or programmable consumer electronics, network PCs, minicomputers, mainframe computers, and the like. Aspects of the invention provide an efficient and useful way to represent and use information from large, hard to manage data access traces that might otherwise occupy gigabytes of storage.

DETAILED DESCRIPTION

Figure 1:
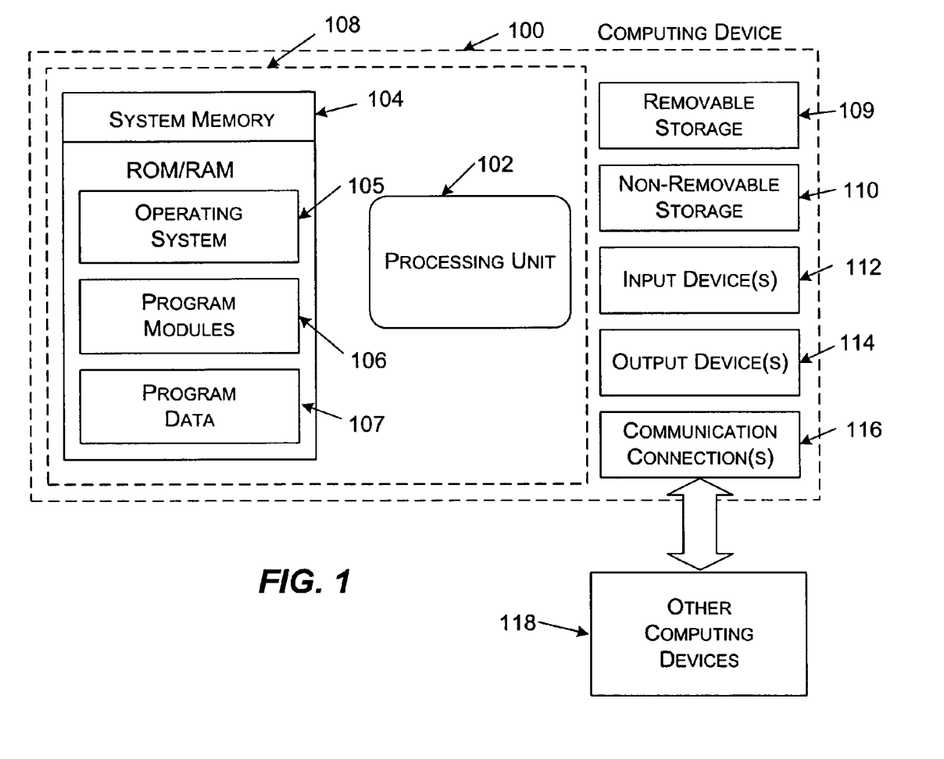
FIG. 1 is a functional block diagram of one computing device adapted to implement an embodiment of the invention.

With reference to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer-readable instructions, data structures, program modules or other data. System memory 104, removable storage 109 and non-removable storage 110 are all examples of computer storage media. Computer storage media includes RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as a wired network or direct-wired connection, and wireless media such as acoustic, RF, infrared and other wireless media. The term computer-readable media as used herein includes both storage media and communication media.

Figure 2:
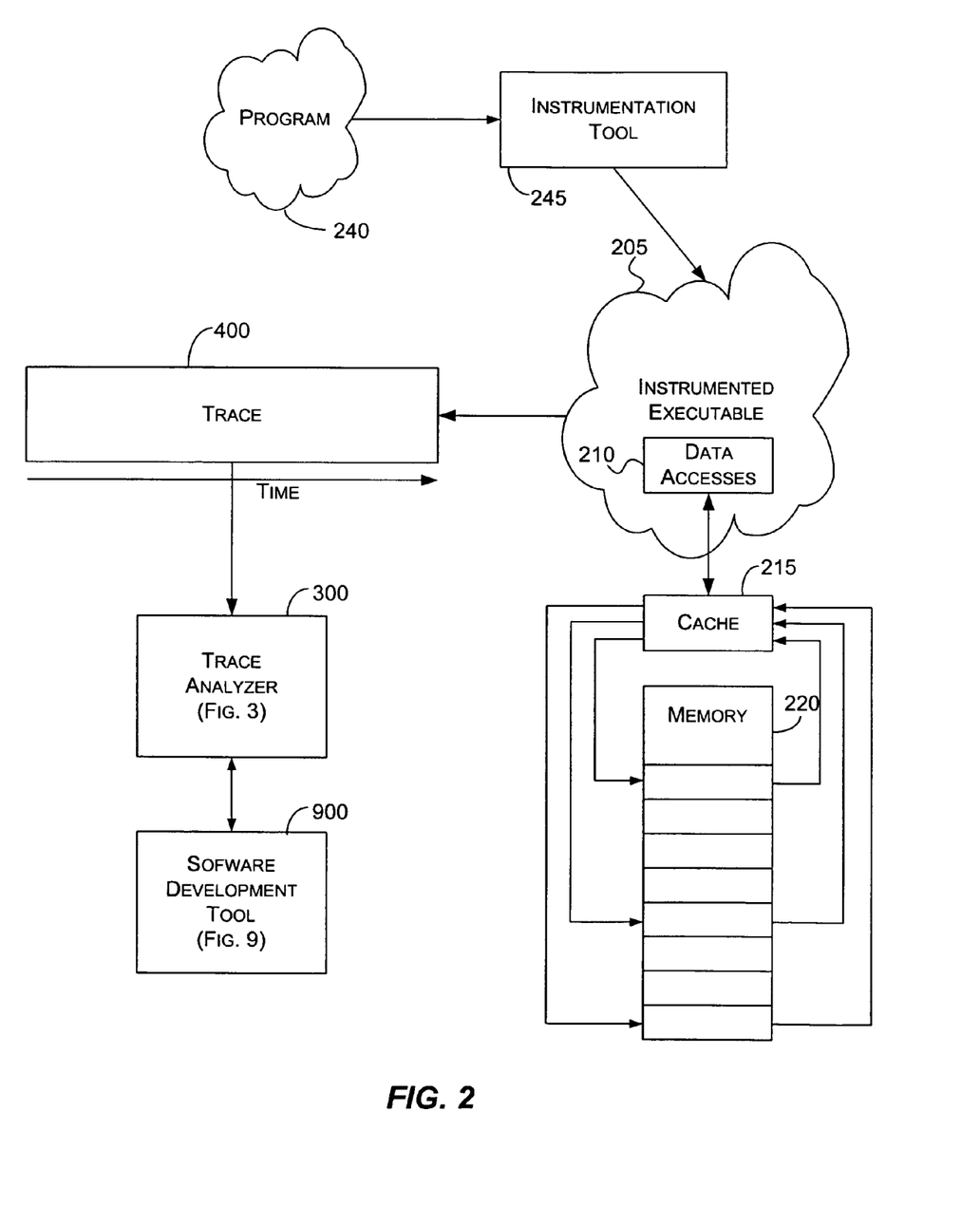
FIG. 2 is a functional block diagram illustrating a system adapted to collect and analyze information about the data accesses of an executable program.

FIG. 2 is a functional block diagram illustrating a system adapted to collect and analyze information about the data accesses of an executable program, according to one embodiment of the invention. Program 240 includes a computer-executable program. It may include source code or binary code suitable for execution on a computer.

Instrumentation tool 245 is configured to receive the instructions of program 240 and instrument program 240 based on the instructions received. Instrumentation tool 245 may be located on the same computer as program 240, or it may be located on a computer networked to the computer containing program 240. If instrumentation tool 245 is on the same computer as program 240, instrumentation tool 245 may be configured to read the instructions of program 240 from RAM, disk, or some other computer-readable memory accessible by the computer on which instrumentation tool 245 resides.

Instrumentation tool 245 may instrument program 240 before, during, or after compilation. In one embodiment, before compilation, instrumentation tool 245 adds source code to program 240 to output trace information as program 240 executes particular instructions.

In another embodiment, instrumentation tool 245 instruments program 240 during compilation. Instrumentation tool 245 may be included in a compiler compiling program 240. At appropriate points, the compiler calls instrumentation tool 245 to insert instrumenting code in the binary executable the compiler is creating from program 240. Alternatively, instrumentation tool 245 may be a separate program called by the compiler as the compiler compiles program 240. In light of this disclosure, those skilled in the art will recognize that instrumentation tool 245 could be used with a compiler in many different ways to instrument program 240 during compilation without departing from the spirit or scope of this invention.

In yet another embodiment, instrumentation tool 245 instruments a binary executable of program 240. In this embodiment, instrumentation tool 245 inserts code into the binary executable to outputs trace information while the binary executes.

In yet another embodiment, instrumentation tool 245 attaches to and dynamically instruments a binary executable of program 240, while the binary is executing.

Program 240 may be written for an interpreter to execute. Generally, interpreters do not require a binary in order to execute the instructions of a program. In one embodiment, instrumentation tool 245 instruments program 240 by adding instrumenting code before an interpreter executes program 240.

In another embodiment, the interpreter executing program 240 is modified to include instrumentation tool 245 such that instrumentation tool is called when program 240 executes particular instructions. Then instrumentation tool 245 outputs trace information related to the instructions. In other words, program 240 would not need code added to produce a trace. Instead, the interpreter may recognize instructions that instrumentation tool 245 traces and calls instrumentation tool 245 when these instructions are executed.

When code is instrumented, predefined actions occur upon particular program behavior. For example, program 240 may be instrumented to write data to a data file whenever certain memory is written to or read from. As another example, program 240 may be instrumented to produce a trace of instructions executed. In the embodiment of the invention shown in FIG. 2, program 240 is instrumented to generate a trace relating to data accesses performed by program 240.

The result of inserting instrumenting code into program 240 is an instrumented executable, such as instrumented executable 205. Whenever data is accessed as represented by data accesses 210, the instrumentation code within instrumented executable 205 generates trace information to be stored by trace component 400. Alternatively, in the case of some interpreted code, the result is an interpreter modified to execute program 240 that generates trace information as if program 240 had been instrumented.

Data accesses 210 within instrumented executable 205 represent data access requests made by instrumented executable 205. Such requests are generally sent to cache 215. Cache 215 provides high speed access to data that has been retrieved or written to previously. Generally, a cache is smaller than memory 220, so typically, cache 215, even when fully utilized, may only contains a fraction of memory 220. A request for data that is not in cache 215 causes a request to be sent to memory 220 for the data. When memory 220 responds with the data, the data is returned to the requesting entity and stored in cache 215. As long as new data does not overwrite the data in cache 215, future requests for the same data are typically fulfilled much quicker than if the data is retrieved from memory 220.

A request for data not contained in cache 215 which is satisfied from memory 220 may take two or more orders of magnitude longer than a data request satisfied from cache 215.

An embodiment of trace component 400 is described in greater detail in conjunction with FIG. 4 as described below. Briefly described, trace component 400 is configured to receive trace information and store the trace information for future access. The trace information may be stored in memory, on disk, or in other computer-readable media. Furthermore, a trace received by trace component 400 may be stored on the same computer system in which instrumented executable 205 executes, or it may be stored on a computer system communicating with the computer system upon which instrumented executable 205 executes.

In one embodiment of the invention, trace component 400 receives trace information from instrumented executable 205. In another embodiment of the invention, trace component 400 receives trace information from another source such as disk, memory, or another computer system. Being able to receive trace information from other sources allows trace component 400 to store previous traces which can then be analyzed. In other words, trace component 400 is not limited to receiving trace information from an executing instrumented executable. As long as the trace information is in a form appropriate for trace component 400 to receive, it does not matter where the trace information comes from.

Trace analyzer 300 is configured to receive a sequence of elements of a trace from trace component 400 and to analyze the sequence received. Additionally, trace analyzer may update data structures indicating the frequency and relationship among sequences of elements. Trace analyzer 300 is described in more detail below in conjunction with FIG. 3.

Software development tool 900 is coupled to trace analyzer 300. Software development tool 900 receives information from trace analyzer 300 and may request information from trace analyzer 300. Software development tool 900 is described in more detail in conjunction with FIG. 9.

Figure 3:
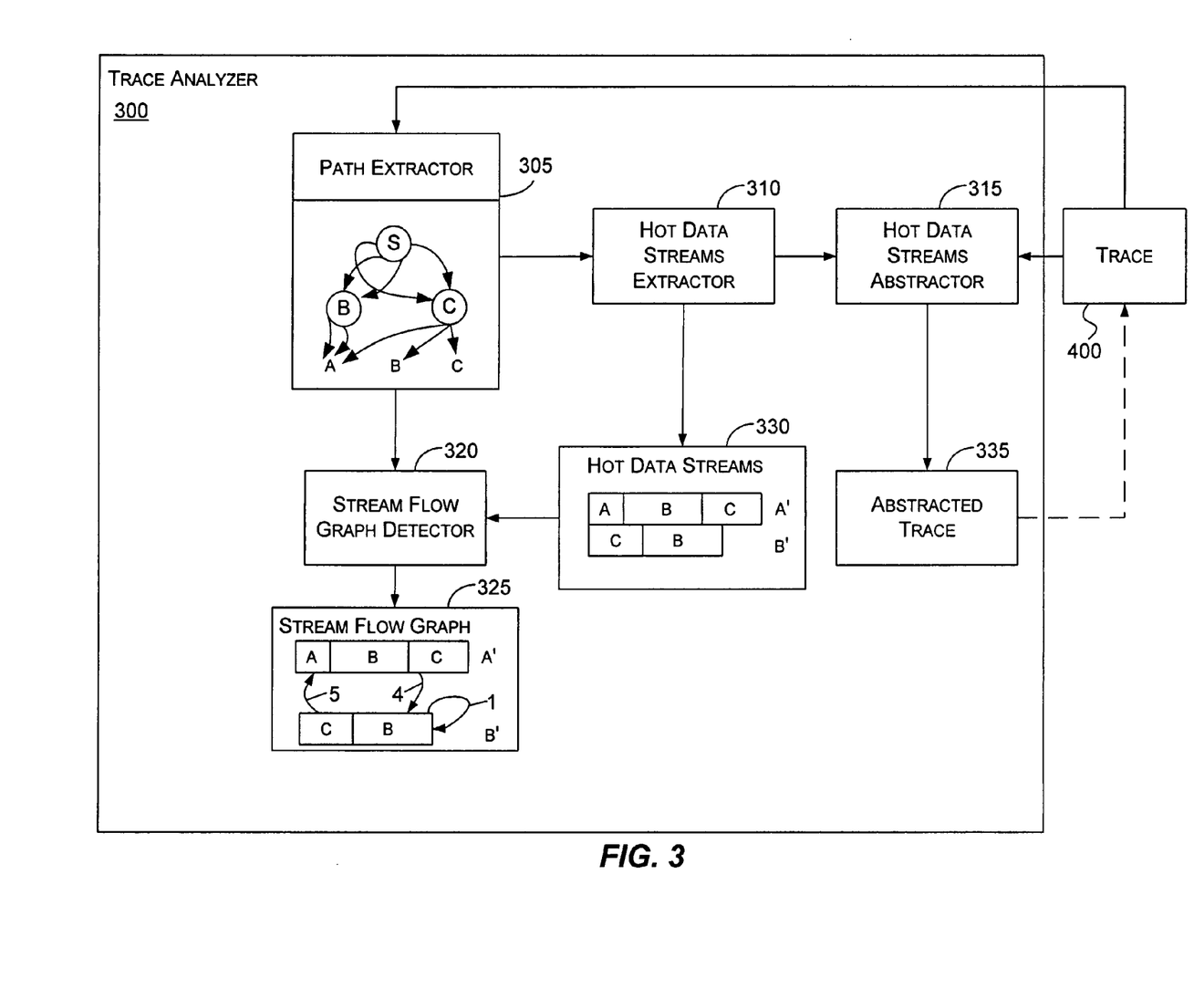
FIG. 3 is a functional block diagram illustrating a system for extracting and analyzing information from a trace of data accesses.

FIG. 3 is a functional block diagram illustrating a system for extracting and analyzing information from a trace of data accesses, according to one embodiment of the invention.

The system includes path extractor 305, hot data streams extractor 310, hot data streams abstractor 315, stream flow graph detector 320, stream flow graph 325, hot data streams 330, and abstracted trace 335.

Hot data streams extractor 310 is coupled to path extractor 305, hot data streams abstractor 315, and creates hot data streams 330. Stream flow graph detector 320 is coupled to path extractor 305 and uses hot data streams 330 to create stream flow graph 325. Trace component 400 is coupled to path extractor 305, hot data streams abstractor 315, and may receive a modified trace from abstracted trace 335. Hot data streams abstractor 315 may generate abstracted trace 335.

Path extractor 305 is configured to receive a trace from trace component 400, to transform the trace received into Whole Program Streams (WPS), and to send the WPS to hot data streams extractor 310 and possible stream flow graph detector 320. In one embodiment of the invention, path extractor 305 receives the trace after several data accesses have been stored in trace component 400 and then constructs WPS. In another embodiment of the invention, path extractor 305 receives the data accesses as they are generated and constructs WPS while instrumented executable 205 executes. Path extractor 305 may form WPS by constructing a context free grammar. The grammar includes rules for generating sequences of data accesses corresponding to the data access sequences in the trace received from trace component 400. The grammar may be represented as a Directed Acyclic Graph (DAG) as shown within path extractor 305.

By transforming the trace received from trace component 400 to WPS, path extractor 305 typically reduces the amount of data needed to represent a trace. A trace received by trace component 400 may consume gigabytes of storage, even for a relatively short execution of instrumented executable 205. For example, the inventors have noticed that, in actual use, 252.eon, a SPECint 2000 benchmark, generated a trace of 2.6 gigabytes in 60 seconds of run time. In one actual implementation, path extractor 305 compressed the 252.eon trace to less than 6 megabytes giving a 456 to 1 compression ratio. As will be discussed later, path extractor 305 may also operate on a trace generated by hot data streams abstractor 315. When it does so, it may compress the generated trace even more.

In transforming the trace from trace component 400, path extractor 305 may eliminate redundant or unnecessary information to reduce the amount of data to that which is pertinent for analyzing program 240's data access patterns. Path extractor 305, for example, may eliminate stack references. Stack references are typically located closely together in memory. Because of the locality of stack references, data accesses to one element in a stack typically cause other elements in the stack to be retrieved as well. Thus, optimizing sequences of stack references further does not generally yield as much improvement as optimizing other data access sequences. For this reason, and to reduce the size of data to be analyzed, stack references, may be eliminated in the trace received from trace component 400.

Figure 4:
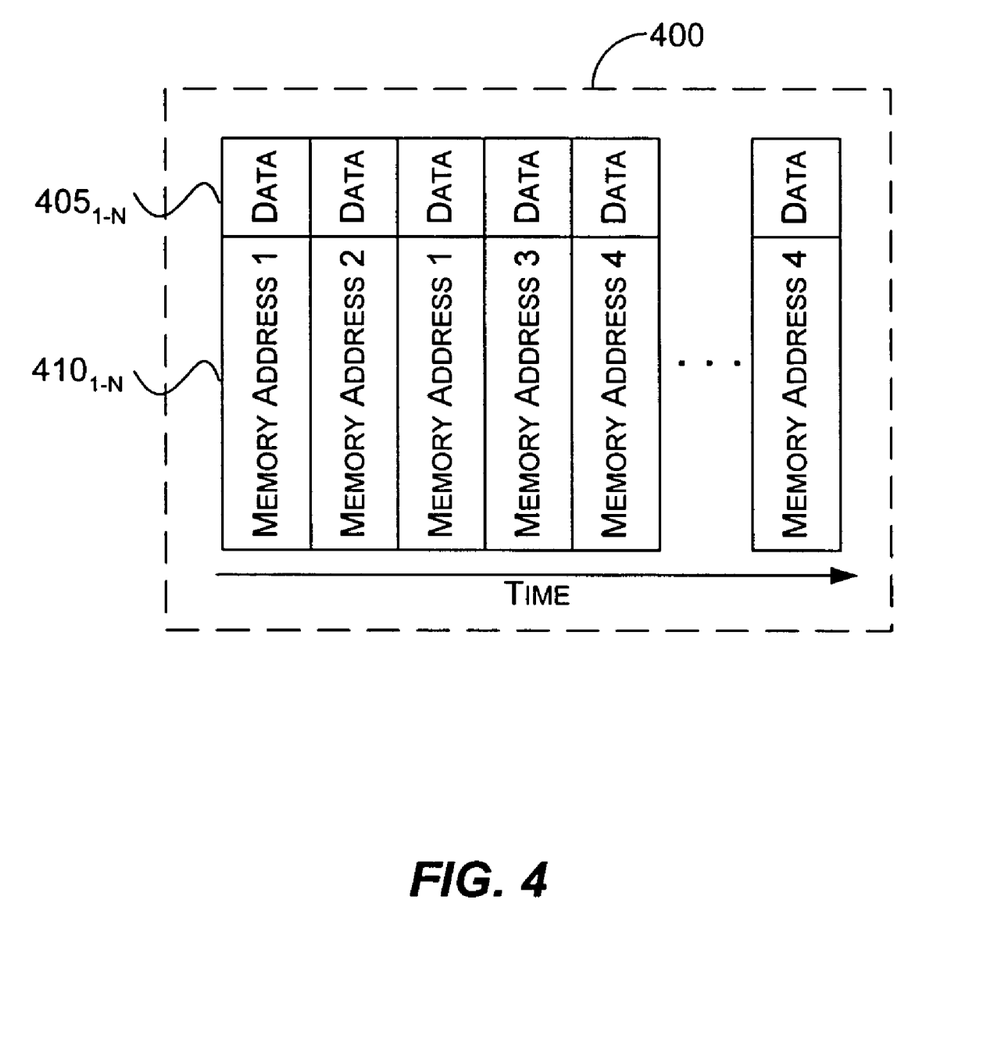
FIG. 4 illustrates components of a sample trace.
Figure 8:
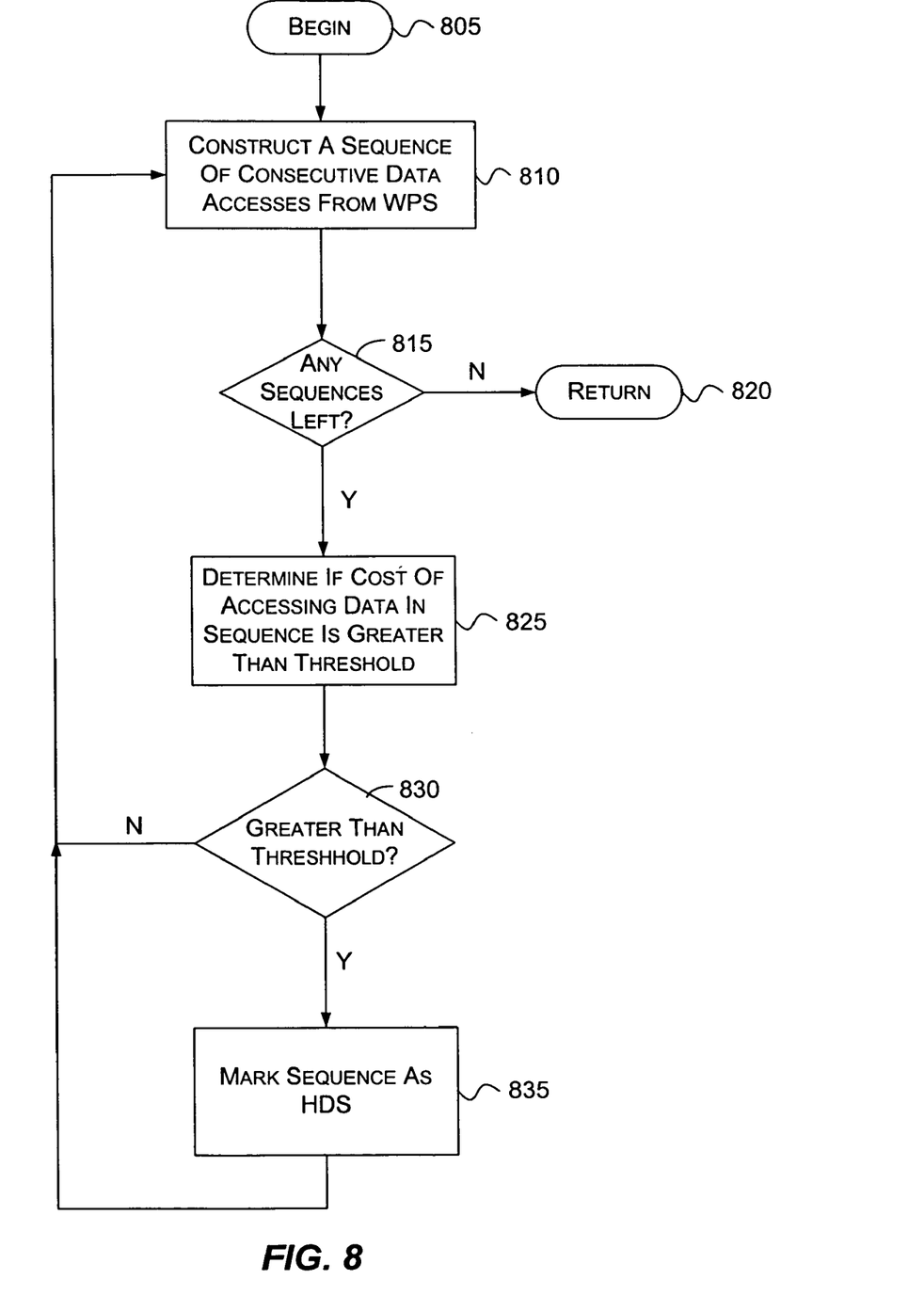
FIG. 8 is a logical flow diagram illustrating a process for determining hot data streams.

In addition, path extractor 305 may transform related data addresses to make the data access sequence easier to analyze, more compressible, and/or for other reasons discussed in conjunction with FIGS. 4 and 8.

Hot data streams extractor 310 is configured to receive a WPS from path extractor 305. Hot data streams extractor 310 analyzes the WPS to discover hot data streams 330. Discovered hot data streams 330 may then be used for further analysis A hot data stream is a frequently repeated sequence of consecutive data references. Stated more formally, a hot data stream is a sequence of R or fewer consecutive data references that incur a cost of C or more, where C is formed from the product of the number of references in the data stream and the frequency with which the stream occurs. For example, a sequence of consecutive data references that includes only ten references and repeats only once has a lower cost than a sequence of consecutive data references that includes only two references and repeats six times. Hot data streams may be used to provide feedback to a software developer using a software development tool. Providing this feedback is described in more detail in conjunction with FIG. 9.

Hot data streams 330 may be sent to stream flow graph detector 320 and/or hot data streams abstractor 315. Stream flow graph detector 320 may use the WPS created by path extractor 305 in conjunction with hot data streams 330 to create stream flow graph 325. A stream flow graph shows the number of times in a trace each hot data stream immediately follows another hot data stream, when intervening cold references are ignored. For example, in stream flow graph 325, the hot data stream designated by B' follows the hot data stream designated by A' 4 times and follows itself once. In addition, the hot data stream represented by A' follows the hot data stream represented by B' 5 times.

The following example illustrates this in a relatively simple WPS. Assume a WPS of CB ABC EF CB ABC FF CB ABC CB ABC CB D CB ABC (where spacing is added for readability and hot data streams are shown in bold). ABC directly follows CB 5 times and CB directly follows ABC 4 times and itself once (ignoring intervening cold references). In some senses, stream flow graphs may be thought of as control flow graphs for data accesses. In a more complicated stream flow graphs, many hot data streams may be interconnected by edges showing how often each hot data stream follows another.

Such stream flow graphs may be used in improving program performance. For example, the number of times a particular hot data stream follows another may be converted into a probability of the hot data stream following the other. If a software developer is informed of this probability (or can browse a stream flow graph showing such probabilities), he or she may be able to restructure a program's data accesses to improve performance and remove or lessen bottlenecks. This is particularly so if the hot data stream is tied to the source code so that a developer may easily determine what code is related to what hot data stream.

Stream flow graph detector 320 may use the WPS extracted by path extractor 305 to determine whether one hot data stream immediately follows another. This may be done because the WPS includes information necessary to reconstruct the given trace and thus in combination with a list of hot data streams may be used to determine the number of times each hot data stream immediately follows another.

In some embodiments of the invention, stream flow graph detector is continually receiving hot data streams and WPS. That is, each time an instrumented program generates a new data address, it is inputted into path extractor 305 which sends it to stream flow graph detector 320. Stream flow graph detector 320 uses the data address to update stream flow graph 325 in real time as the program executes. Because of the relatively low memory requirements for storing stream flow graphs, this may use a negligible amount of memory. At the same time, however, the information contained in the dynamically updated stream flow graph may be used by a software developer (or automated optimizer) to increase performance by restructuring a program's data accesses.

Hot data streams abstractor 315 receives hot data streams from hot data streams extractor 310. It uses the hot data streams together with the trace from trace component 400 to remove cold data streams from a trace. The remaining hot data streams may then be abstracted and stored in abstracted trace 335. Abstracting the remaining hot data streams may mean replacing a hot data stream, such as ABC, with a single reference, such as A', that represents the hot data stream.

After hot data streams have been abstracted into abstracted trace 335, they may be inputted into trace component 400 which may then be used again by trace analyzer 300. With each iteration, the amount of information required for storing the WPS and the stream flow graphs generally decreases. At the same time, information regarding the exact sequence of data accesses is lost as the cold data streams are removed from the trace. Through this method, hundreds of gigabytes of trace information may be reduced to one megabyte or a few hundred kilobytes.

FIG. 4 illustrates components of a sample trace, according to one embodiment of the invention. The trace stored in trace component 400 includes a sequence of memory addresses $410_{1-N}$ and data elements $405_{1-N}$. In one embodiment of the invention, the sequence is in chronological order. The trace stored in trace component 400 may include less than all data access references a program generates. For example, some data references such as stack references and other data references may not be included in the trace stored in trace component 400. This would happen, for example, if program 240 were instrumented such that it did not output trace information when such a reference occurred.

A trace entry includes at least a memory address and may also include a data element. Each memory addresses in the trace stored in trace component 400 may be an actual memory address referenced by a program or it may be a different memory address or identifier related to the memory address accessed by the program. For example, a heap object may be accessed using several different memory addresses. The heap object may include an array of data elements which are each accessed individually. Without mapping such accesses to a unique identifier identifying the heap object, such accesses might appear to be accesses to several different data objects. For this reason and reasons discussed in conjunction with FIG. 7, references to data elements within the same heap object may be mapped to a unique identifier identifying the heap object.

To be able to map different related heap addresses to a unique heap object, it may be necessary to collect information about allocations and deallocations of heap objects. The information may include the allocation/deallocation program counter, the start address of the allocated/freed memory, the size of the allocated/freed memory, a global counter that uniquely identifies a particular allocation/deallocation, the last three functions on the call stack, and other data. In one embodiment of the invention, the information is maintained in an auxiliary trace with indexes to indicate where in the data reference trace the allocations and deallocations occur. In another embodiment of the invention, the information is interleaved with the data addresses in a single trace.

In addition, as the heap is often reused for various objects, a global counter may be incremented and combined with a heap reference to create a unique identifier to an object found on the heap. This identifier may be used to distinguish heap memory references that are identical but refer to different objects. In other words, even if a heap reference were later found in a program that accessed a previously accessed memory location, the identifier may be used to determine whether the reference is to a previously referenced object or a new object.

Data elements $405_{1-N}$ may include data such as a time stamp, a program counter value, a reference type, e.g. stack reference, heap reference, global reference, program call stack, etc., an identifier uniquely identifying a heap allocation, information identifying a thread accessing the data, or other information useful for later analysis.

Figure 5:
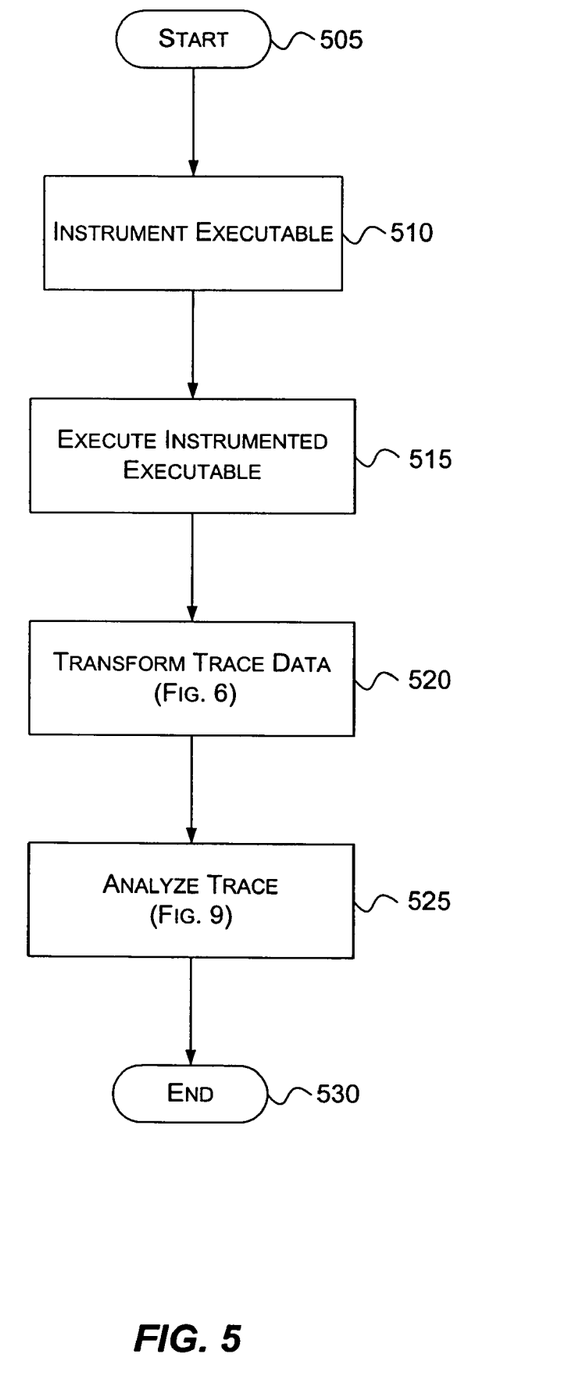
FIG. 5 is a logical flow diagram illustrating a process for creating and analyzing a trace file.

FIG. 5 is a logical flow diagram illustrating a process for creating and analyzing a trace file, according to one embodiment of the invention. The process begins at block 505 when a user desires to discover data access patterns in an executable program. For example, referring to FIG. 2, a user may wish to discover any hot data streams occurring as a result of executable program 240's data accesses.

At block 510, an executable program is instrumented to output data access information. For example, referring to FIG. 2, instrumentation tool 245 inserts instrumentation code into executable program 240. The instrumentation code is designed to output data accesses performed by the executable program 240. After instrumenting code has been inserted into the executable program, processing continues at block 515.

At block 515, the instrumented executable program is executed. While the instrumented executable program executes, the instrumentation code within the instrumented executable program outputs a data access sequence of the executable program. The data access sequence is stored in a trace in RAM, on disk, or in some other computer-readable media. For example, referring to FIG. 2, as instrumented executable 205 executes, the data access sequences of executable program 240 are stored in trace component 400.

At block 520, the trace may be transformed to remove unnecessary data access references and to modify other data access references to improve compressibility of the trace. Briefly described, stack references may be removed and heap references may be modified. This is described in more detail in conjunction with FIG. 6. For example, referring to FIG. 3, path extractor 305 receives a trace from trace component 400 and may modify heap references and remove stack references.

Figure 7:
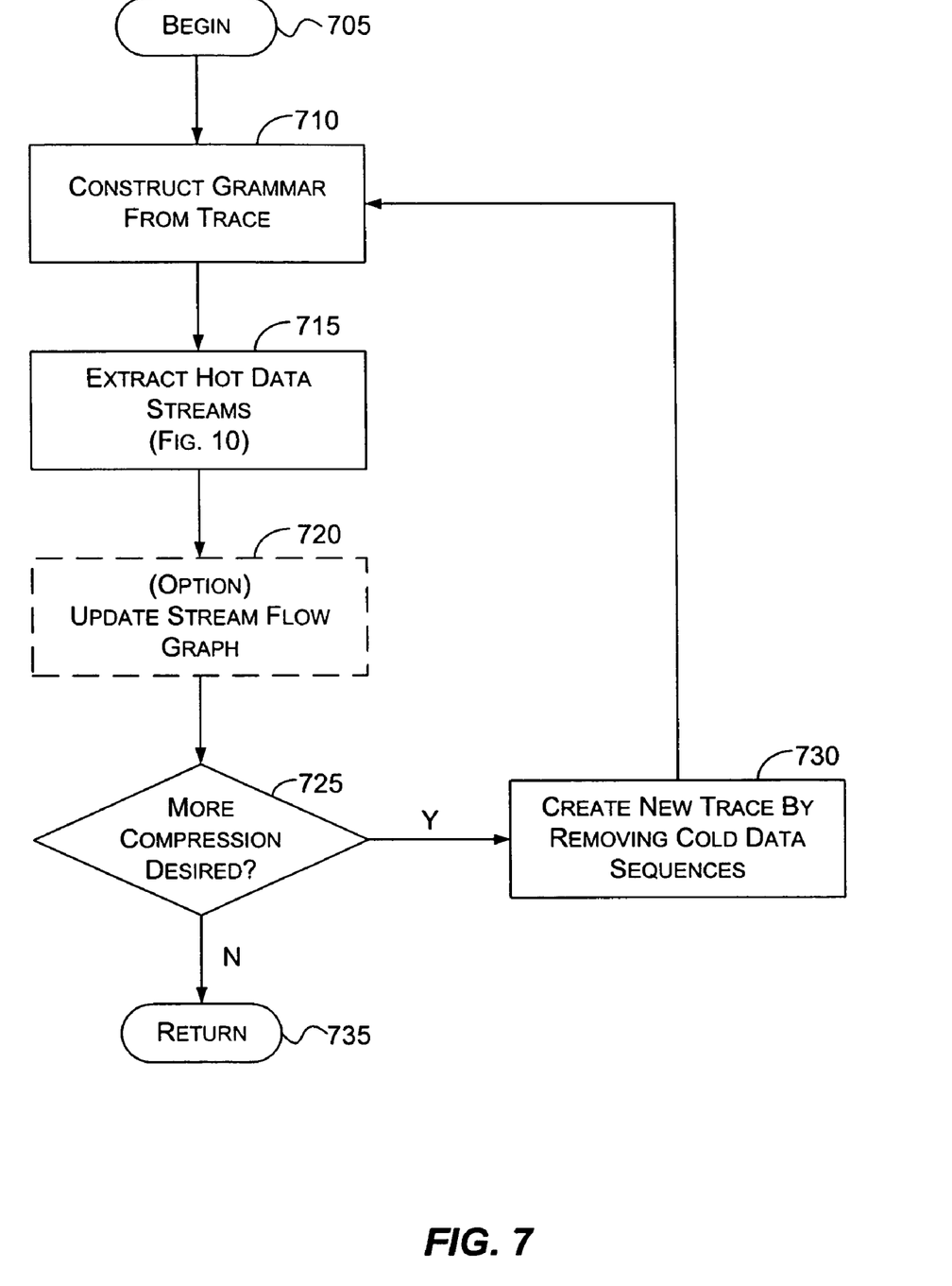
FIG. 7 is a logical flow diagram illustrating a process for analyzing and optionally compressing even further a trace.

At block 525, the trace is analyzed as described in more detail in conjunction with FIG. 7. Briefly, a grammar is extracted representing the trace, hot data streams are extracted, and a stream flow graph may be updated. The trace may then be further compressed by removing cold data streams and repeating the above process.

In another embodiment of the invention, the trace generated at block 515 does not include all data accesses. For example, stack references may not be recorded in the trace file. This could be accomplished by instrumenting the executable program such that no output is generated when the executable program accesses a stack data reference. In this embodiment of the invention, removing stack references at block 520 is not necessary.

In another embodiment of the invention, the heap references in the trace generated at block 515 may be transformed to a more compressible state before the process reaches block 520. This could be accomplished by instrumenting the executable program such that heap references are transformed as described in more detail in conjunction with FIG. 6. In this embodiment of the invention, transforming heap references at block 520 is not necessary.

Figure 6:
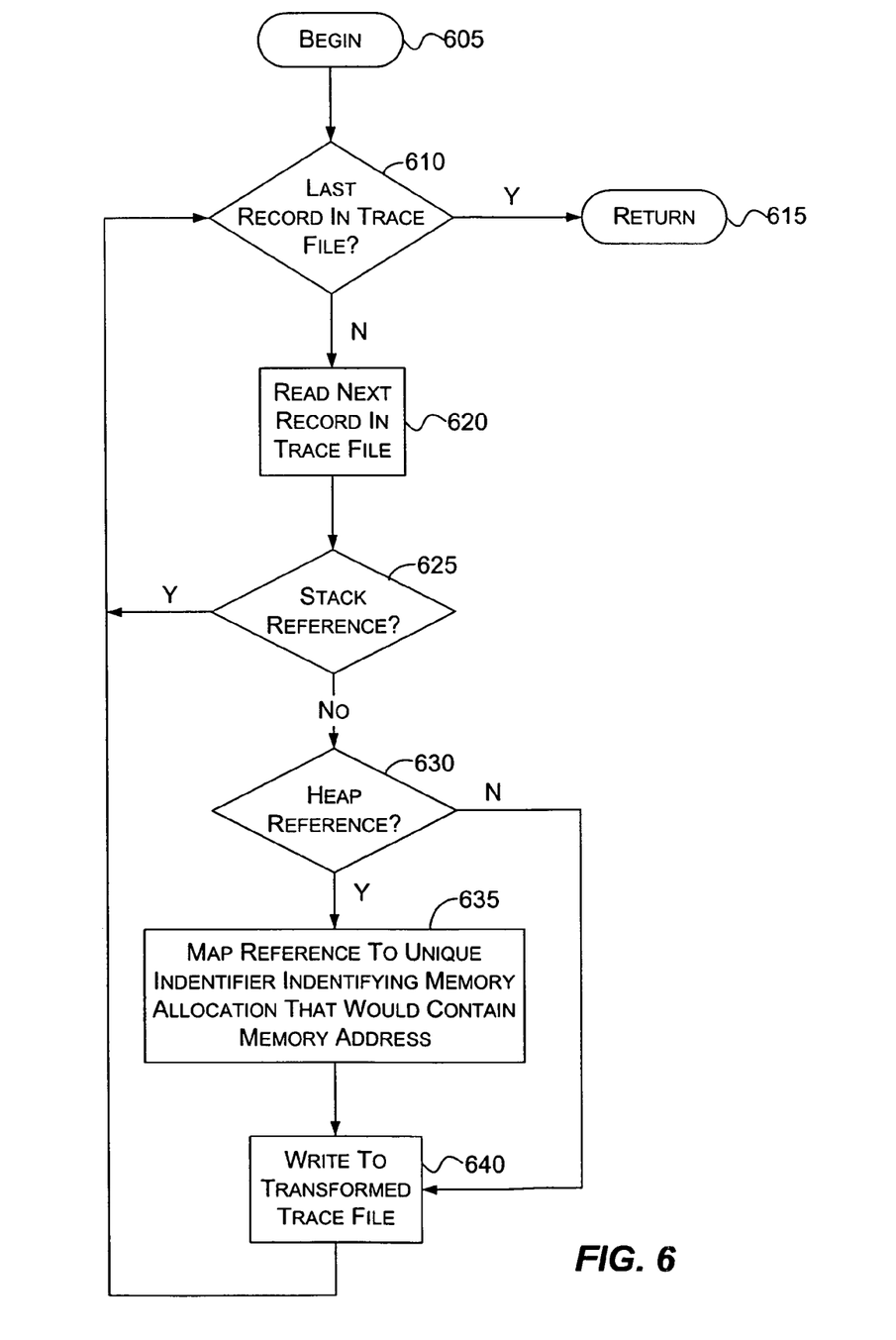
FIG. 6 is a logical flow diagram illustrating a process for transforming a data accesses trace file into a more compact form.

In another embodiment of the invention, instrumentation tool 245 instruments the executable such that stack references are omitted from the trace file and heap references are transformed in a manner similar to that described in conjunction with FIG. 6. This could be accomplished by instrumenting the executable appropriately. In this embodiment of the invention, block 520 is not necessary and processing flows directly from block 515 to block 525.

At block 530, processing ends. At this point, an executable has been instrumented and executed. In executing it has generated a trace file that may then be transformed to remove certain references and transform other references. Finally, the transformed trace file has been analyzed to find hot data streams.

FIG. 6 is a logical flow diagram illustrating a process for transforming a data accesses trace file into a more compact form, according to one embodiment of the invention. The process begins at block 605 after a trace is available for transformation.

At block 610, if there are no more records to be processed in the trace file, processing branches to block 615; otherwise, processing branches to block 620.

At block 620, a record is read from the trace file. In one embodiment of the invention, the next record in the trace file is read from disk. In another embodiment of the invention, the next record is read directly from memory. In yet another embodiment of the invention, the next data access record is obtained from a program that is currently executing.

At block 625, a determination is made as to whether the next record in the trace file is a stack reference or not. If the next record in the trace file is a stack reference, processing branches to block 610. If the next record in the trace file is not a stack reference, processing branches to block 630.

At block 630, a determination is made whether the next record in the trace file is a heap reference. If the record in the trace file is a heap reference, processing branches to block 635. If the record in the trace file is not a heap reference, processing branches to block 640.

At block 635, a heap reference is mapped to a unique identifier identifying the memory allocation containing the memory address of the heap reference. For example, a program may request a block of memory from the heap during program execution. Such a memory request might be used for an array of data elements. Subsequently, the program may use the array for various operations and calculations. At block 635, each data access reference to the array is mapped to a single identifier identifying the memory block.

Mapping each data access to data within a block to the same identifier has several advantages. One advantage is that it greatly increases the compressibility of the data access pattern. This occurs because a series of accesses to data within the memory block is no longer treated as a series of accesses to multiple addresses; rather, it is treated as a series of accesses to a single identifier. This makes the data access sequence more repetitive. Typically, the more repetitive a sequence is, the more compressible it is.

Another advantage to mapping each data access to data within a block to the same identifier is that it simplifies analysis of a data access sequence. Specifically, instead of analyzing the sequence within the block, an analyzer can focus on a sequence of blocks accessed. Typically, information about the sequence of blocks accessed is more important to improving cache and memory performance than information about the sequence of memory addresses accessed within a block. This is true because generally a memory block allocation allocates contiguous memory. Data located in contiguous memory is typically placed on the same memory page or on contiguous memory pages. Because many memory managers retrieve and flush pages of memory to disk in one operation, access to a data element within a block typically causes all or a substantial portion of the data in the block to be retrieved into main memory at one time. Consequently, other accesses to data in the block typically incur no extra retrieval time.

Accesses to data elements in different blocks, on the other hand, often do cause extra retrieval time. This occurs because blocks obtained by memory allocations are typically scattered in memory or on disk. While accessing a data element in one block often causes the rest of the block to be retrieved into memory, accessing a data element in one block does not typically cause the next needed data block to be retrieved into memory. But a software developer (or automated optimizer) aware of sequences of data blocks that will be requested or allocated by a program could restructure a program to cause the elements of a sequence to occur in close proximity and possibly on the same memory page.

By mapping each reference to a memory address in a block of memory to a unique identifier, some information is lost. Specifically, rebuilding the exact data access sequence from the mapped representation may no longer be possible. However, as stated above, being able to rebuild the exact data access sequence within a block is not generally required to improve memory and cache performance.

At block 640, transformed data is written to a transformed trace file. The transformed trace file may be in RAM or on some other computer-readable media such as a disk. The transformed trace file may then be used for finding hot data streams.

After block 640, processing continues at block 610 to determine if there are any more records in the trace file to be transformed, and the process may repeat until no more records remain.

At block 615, the process returns to the calling process. At this point, stack references have been removed and heap references have been transformed. Trace analysis may now be performed.

FIG. 7 is a logical flow diagram illustrating a process for analyzing and optionally compressing even further a trace, according to one embodiment of the invention. The process begins at block 705 after a trace is available for processing.

At block 710, a grammar is constructed representing the data accesses of the trace file. The grammar is also known as WPS and represents the data accesses the executable program performs. The grammar may be represented as a directed acyclic graph (DAG). The grammar generates a string, which is the input sequence of data accesses. The data access trace can be regenerated by traversing the DAG in postorder. The DAG representation of the grammar permits efficient analysis and detection of hot data streams. For example, referring to FIG. 3, path extractor 305 constructs a grammar from the trace file. An example of a DAG is seen within path extractor 305.

An algorithm that may be used to implement block 710 according to one embodiment of the invention is the SEQUITUR algorithm. For information regarding the SEQUITUR algorithm, see C. F. Nevill-Manning and I. H. Witten, "Compression and explanation using hierarchical grammars," The Computer Journal, vol. 40, pp. 103–116, 1997. Another algorithm that may be used to implement block 710 according to another embodiment of the invention is a modification of the SEQUITUR by James R. Larus. For this modification, see James R. Larus, "Whole program paths," Proceedings of the ACM SIGPLAN'99 Conference on Programming Language Design and Implementation, pp. 259–269, May 1999. Other hierarchical grammar construction algorithms may be used to implement block 710 in other embodiments of the invention.

At block 715, the grammar is used to discover hot data streams. Briefly described, the grammar is examined for patterns of frequently repeated data access sequences. Data sequences frequently repeated are marked as hot if the product of the number of repetitions and the length of the sequence exceeds a selectable threshold. Discovering hot data streams is described in more detail in conjunction with FIG. 8. For example, referring to FIG. 3, hot data streams extractor 310 uses the grammar constructed by path extractor 305 to discover hot data streams.

At block 720, a stream flow graph may be updated. For example, an edge of stream flow graph 325 of FIG. 3 may be incremented to account for one hot data stream, such as A', following another hot data stream, such as B'. Alternatively, a new hot data stream may be added to the stream flow graph, with an edge to it from the hot data stream that was last accessed.

At block 725, a determination is made as to whether more compression (or abstraction) of the trace is desired. If so, processing branches to block 730; otherwise processing branches to block 735. For example, in a multi-gigabyte trace file, one pass through the process shown in FIG. 7, may not compress a trace sufficiently for it to be used effectively.

At block 730, a new trace is created, in part, by removing cold data sequences. In addition, each hot data stream may be replaced with a symbol representing it. For example, referring to FIG. 3, the hot data sequence ABC may be replaced with A'. A table may also be constructed that associates each symbol with the hot data stream it represents, so that a data stream may be reconstructed. The trace created at block 730 then be used in another iteration of the process shown in FIG. 7.

At block 735, the process returns to the calling process. At this point, hot data streams have been extracted through one or more iterations of trace analysis. These hot data streams may then be used to provide feedback to a software developer (or automated optimizer) as described in conjunction with FIG. 9.

FIG. 8 is a logical flow diagram illustrating a process for determining hot data streams, according to one embodiment of the invention. The process begins at block 805 after a WPS has been created.

At block 810, a sequence of consecutive data accesses is constructed from the WPS. In one embodiment of the invention, the sequence is constructed by postorder traversal of the DAG representing the WPS, where each node is visited once. In this embodiment, at each interior node, the consecutive data access sequences are constructed by concatenating data access sequences in substreams produced by two or more of the node's descendants.

In another embodiment of the invention, at block 810, construction of a sequence starts with a small sequence of data accesses that has not already been determined to be a hot data stream. Addition of sequences to the beginning or end of the sequence continues until the sequence constitutes a hot data stream. In this way, minimal hot data streams may be constructed. A minimal hot data stream is a sequence of data accesses which incurs a cost greater than or equal to C, but incurs a cost less than C when any part of the sequence is removed from the beginning or end of the data accesses sequence. C is the threshold cost a data access sequence must incur to be considered a hot data stream. Minimal hot data streams are useful since all non-minimal hot data streams are formed by adding a data access sequence to the beginning or end of a minimal hot data stream.

At block 815, the existence of a sequence is tested. If no sequence was constructed, processing branches to block

820, where the process returns to a calling process. If a sequence was constructed, processing branches to block 825.

At block 825, a determination is made as to whether the cost of accessing data in the sequence is greater than a threshold. Cost is the product of the number of references in the data sequence multiplied by the number of times the data access sequence is repeated. Preferably, the threshold may be set such that the hot data streams resulting cover 90% of the data accesses of the entire trace. Setting such a threshold is often an iterative process and may be automated as one generally does not know how low or high to set the threshold to cover 90% of the data accesses without experimentation.

At block 830, a determination is made as to whether the cost of accessing the sequence is greater than the threshold. If the cost is not greater than the threshold, processing branches to block 810. If the cost is greater than the threshold, processing branches to block 835.

At block 835, the data access sequence is marked as being a hot data stream. Then, process flow continues at block 810, until no sequences remain at decision block 815. At that point, hot data streams in the DAG have been identified and can be used for feedback to a software developer (or automated optimizer).

Illustrative System Utilizing Hot Data Streams and/or Stream Flow Graphs

The previous discussion relates to the discovery of hot data streams and stream flow graphs. The discussion below relates to how these may be used to provide feedback to a software developer (or automated optimizer).

Figure 9:
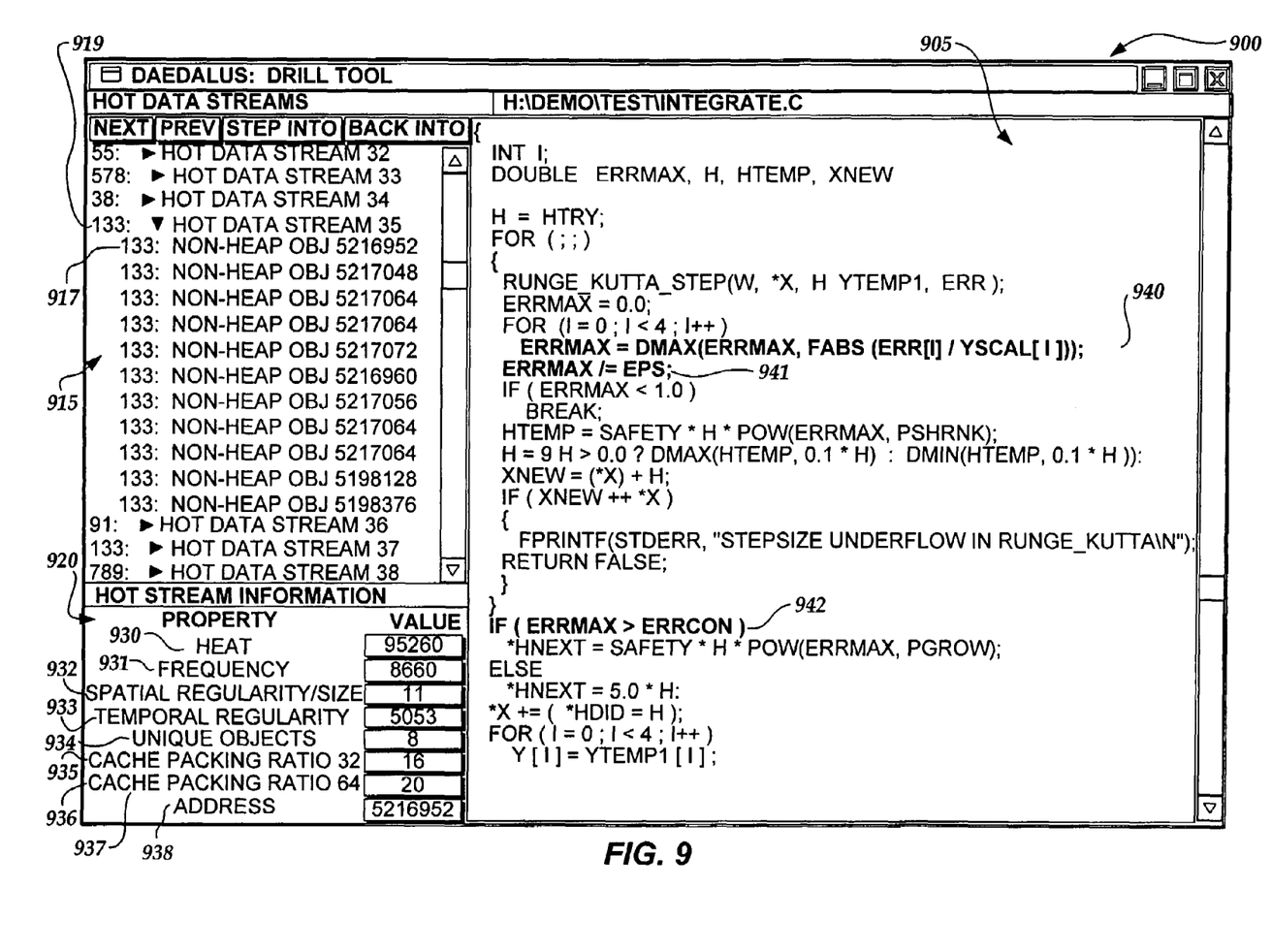
FIG. 9 shows an exemplary software development tool providing a software developer with access to information about hot data streams, in accordance with the invention.

FIG. 9 shows an exemplary software development tool providing a software developer with access to information about hot data streams, according to one embodiment of the invention. Software development tool 900 includes workspace 905, navigation pane 915, selected object reference 917, hot data stream 919, properties pane 920, properties 930–937, and lines 940–942. Software development tool 900 may have other panes or configurations for providing feedback from hot data streams or may have components resized or placed differently without departing from the spirit or scope of the invention.

Software development tool 900 is an example of a visual development environment. The term "visual development environment" includes any program that may be used to develop software. For example, one such program that may be used is notepad produced by Microsoft Corporation of Redmond, Wash. Two UNIX programs are VI and EMACS. These programs allow entry of text (code) and saving of text. A C or C++ program could be developed using notepad, VI, and/or EMACS. Certainly, a C or C++ compiler may also be required to produce an executable. As such, the compiler may be part of another visual development environment, or if closely coupled to the editor, such as EMACS, may be part of the visual development environment of the code entry tool—in this case EMACS.

Another visual development environment is BORLAND® Enterprise Studio, JAVA™ Edition produced by Borland Software Corporation of Scotts Valley, California. This development environment includes a suite of components designed to work with each other. For example, BORLAND® Enterprise Studio, JAVA™ Edition may include JBUILDER™ 4 Enterprise, MACROMEDIA° DREAMWEAVER® ULTRADEV™, RATIONAL ROSE® with JBUILDER™ integration, and RATIONAL UNIFIED PROCESS™. Another example of a visual development environment is VISUAL STUDIO® produced by Microsoft Corporation of Redmond, Wash. In some visual development environments, placing a graphical component on a screen, such as a message box, may be done by dragging an icon associated with the message box into the visual development environment. Other visual development environments, such as VI and notepad, do not allow objects to be dragged into them as part of software development.

Web development tools, client/server development tools, and all other software development tools that visually display code and/or graphical components may be classified as "visual development environments."

Workspace 905 shows some of the source code for the file H:\demo\test\integrate.c. The program shown is written in the C programming language. Bolded lines 940–942 correspond to hot data stream 919. Workspace 905 is where a software developer may modify source code, delete source code, view source code, or enter new source code. The source code may be color coded to aid in understanding program flow, to point out particular sections, or for other reasons.

Line numbers indicating what lines in the source code are shown may be added to workspace 905. In one embodiment of the invention, such line numbers are placed in a column immediately to the left of workspace 905. Line numbers may be shown to indicate to a developer the lines shown in workspace 905.

Navigation pane 915 shows a list of hot data streams together with navigation aids for viewing hot data streams and objects referenced in hot data streams and selecting a particular object (or identifier) associated with a particular hot data stream. The left most number on each line in navigation pane 915 shows the beginning line number of the source code associated with the object or hot data stream. When a user clicks on an arrow next to a hot data stream, the hot data stream expands into (or contracts from) a listing of references to objects referenced in the hot data stream.

When a user selects an object in a hot data stream, such as selected object reference 917, the source code associated with the object may be displayed and/or highlighted in workspace 905. In the example shown in the FIGURE, upon selection of hot data stream 919, lines 940–942 are highlighted by bolding the code contained in those lines. Upon selection of selected object reference 917, line 940 becomes highlighted. In navigation pane 915, each object has an associated line number, a type (of object), and a memory location of the object. Other or fewer fields may be shown without departing from the spirit or scope of the invention.

Properties pane 920 provides an area where properties about a selected hot data stream may be displayed. Properties shown in properties pane 920 include heat property 930, frequency property 931, spatial regularity property 932, temporal regularity property 933, unique objects property 934, cache packing ratio property 935, cache packing ratio property 936, and address property 937. This list is by no means exhaustive; and it will be recognized that other properties and data about hot data streams may be shown in properties pane 920 without departing from the spirit or scope of the invention. As the properties in properties pane 920 give a software developer information about a hot data stream, these properties will be explained next.

Heat property 930 is the product of frequency of the hot data stream appearing in a data stream of references multiplied by the size (or spatial regularity) of the hot data stream. Heat property 930 is related to the cost incurred by retrieving the elements of a hot data stream and as such is closely related to the metric for determining which data streams are hot as described in FIGURES above.

Frequency property 931 includes a number of times a hot data stream appeared in a data stream of reference. The trace in trace component 400 of FIG. 1 is an example of a data stream of references.

Spatial regularity property 932 is the number of references to objects (not necessarily unique) in the hot data stream. For example, in hot data stream 919, there are references to 11 objects. These objects are: EPS, ERR[0], ERR[1], ERR[2], ERR[3], YSCAL[0], YSCAL[1], YSCAL[2], YSCAL[3], SAFETY, ERRCON. ERRMAX, HTEMP, H, PSHRNK, XNEW, and X are not considered references to objects as they are referenced on the stack (local variables and procedure parameters) and may be removed as described previously.

Temporal regularity property 933 is the average number of references between two succeeding occurrences of the same hot data stream. A hot data stream that has a relatively large temporal regularity, i.e., a large number of other references between each occurrence, may not be available in cache with each repetition. Thus, each time the hot data stream is encountered, each reference to a data element in the hot data stream may cause a cache miss and require retrieval from main memory. If cache misses can be avoided by structuring data items in the hot data stream such that a request for one retrieves data for another, program performance may improve. Thus, knowing the temporal regularity of a hot data stream may be useful in determining whether to focus on optimizing data accesses for a particular section of code.

Unique objects property 934 is the number of unique objects that are referenced in the hot data stream. The unique objects in hot data stream 919 are: EPS, ERR[0], ERR[1], ERR[2], ERR[3], YSCAL[0], YSCAL[1], YSCAL[2], YSCAL[3], SAFETY, ERRCON.

Cache packing ratio property 935 represents how efficiently objects from a hot data stream are collocated in cache blocks. It is calculated by determining the minimum number of cache blocks it would take to contain all the objects in a hot data stream and dividing this number by the number of cache blocks in which the objects are actually found. A cache block is the minimum unit of transfer to and from a cache. For example, a cache block that has a cache block size of 32 bytes will transfer 32 bytes to or from the cache, even if only one byte is requested or stored. By collocating elements of a hot data stream in cache blocks, the efficiency of each transfer to and from the cache increases as it brings objects that will be required subsequently with objects that are requested. Cache packing ratio property 935 shows the cache packing ratio (in percent) for a cache block size of 32 bytes for hot data stream 919. Cache packing ratio property 936 shows the cache packing ratio (in percent) for a cache block size of 64 bytes for hot data stream 919.

A software developer can use cache packing ratios to restructure a program's data fields. For example, during traversal of a linked list there may be only two items retrieved from each object in the list before moving to another object. In a programming language such as "C", a template for a data structure may be declared by using a struct construct. The data structure may be declared to include several elements or attributes. The elements declared in the template usually follow one another. For example, a declaration of a data structure may look like:

```
struct llObject {
    char sName[30];
    int iAge;
    char sContactInfo[500];
    void *pNext;
}
```

Without other instructions, a compiler may arrange in memory elements of an instance of the structure in the same order as that declared with the struct construct. That is, in memory, sName may be followed by iAge which may be followed by sContactInfo, etc. If a program were to compute the average age using this structure and information about the name or contact was irrelevant, it could do so by traversing the list and retrieving the age attribute of each object. To find the next object, a pointer would be retrieved (pNext). If the elements were arranged in memory in the same order as shown in the struct construct above, processing each object would require two cache misses (assuming the object was not available in cache and that the cache block size was not very large). If, however, the data structure was rearranged as follows:

```
struct llObject {
    char sName[30];
    int iAge;
    void *pNext;
    char sContactInfo[500];
}
``` a request for iAge from a cache would typically cause both iAge and pNext to be retrieved from main memory (for cache block sizes of 8 bytes or more). Thus, traversal of the list might only require one cache miss per object. This might greatly increase program performance if this averaging function was used frequently.

Typically, the lower the cache packing ratio the better the opportunity for optimizing a hot data stream. Conversely, a cache packing ratio of 100% may indicate that further attempts at optimization data accesses to a hot data stream would be counter-productive.

Address property 937 is the memory address of the selected object. For example, selected object reference 917 has a memory address of 5216952 as shown in address property 937.

It will be recognized that other properties could be added and/or existing properties could be removed without departing from the spirit or scope of the invention. Furthermore, the arrangement of the items within software development tool 900 could be changed without departing from the spirit or scope of the invention.

The various embodiments of the invention may be implemented as a sequence of computer implemented steps or program modules running on a computing system and/or as interconnected machine logic circuits or circuit modules within the computing system. The implementation is a matter of choice dependent on the performance requirements of the computing system implementing the invention. In light of this disclosure, it will be recognized by one skilled in the art that the functions and operation of the various embodiments disclosed may be implemented in software, in firmware, in special purpose digital logic, and any combination thereof without deviating from the spirit and scope of the present invention as recited within the claims attached hereto.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for providing feedback regarding a program's data access patterns, comprising:

identifying repetitively occurring data access sequences in a stream of data access references;

displaying a plurality of identifiers, wherein each identifier is associated with one of the data access sequences;

upon selection of one of the plurality of identifiers, identifying code related to the data access sequence associated with the selected identifier; and generating a stream flow output that displays the frequency that repetitively occurring data access sequences follow other repetitively occurring data access sequences when non-repetitively data access sequences are ignored.

2. The method of claim 1, wherein identifying the sequences includes steps, comprising:

constructing a grammar from the stream of data access references;

building a candidate sequence using the grammar; and if a cost of accessing data in the candidate sequence exceeds a threshold, marking the candidate sequence as a repetitively occurring data access sequence.

3. The method of claim 2, wherein computing the cost comprises multiplying a number of times the candidate sequence occurs in the grammar by a number of data access references in the candidate sequence.

4. The method of claim 1, wherein the list of identifiers is displayed in a software development tool.

5. The method of claim 4, wherein the software development tool is a visual development environment.

6. The method of claim 4, wherein the selection is received from a user input device.

7. The method of claim 1, further comprising displaying a navigation pane that displays the list of identifiers and navigates the list in response to user input.

8. The method of claim 1, wherein the code is displayed and highlighted.

9. The method of claim 8, wherein the code comprises source code.

10. The method of claim 8, wherein the code comprises assembly code.

11. The method of claim 1, wherein the code, when previously executed, referenced data in the data access sequence associated with the selected identifier.

12. The method of claim 1, wherein the stream of data access references is included in a trace file.

13. A system for developing computer-executable software, comprising:

an instrumentation tool configured to instrument a software program to produce a trace when the software program is executed;

a trace analyzer configured to receive the trace and identify repetitively occurring data access sequences;

a stream flow detector that is configured to generate a stream flow output that displays the frequency that repetitively occurring data access sequences follow other repetitively occurring data access sequences when non-repetitively data access sequences are ignored; and a software development tool configured to use the identified data access sequences and stream flow output in software development.

14. The system of claim 13, wherein the instrumentation tool, the trace analyzer, and the software development tool are integrated in a visual development environment.

15. The system of claim 13, wherein the trace analyzer identifies repetitively occurring data access sequences by performing steps, comprising:

constructing a directed acyclic graph (DAG) from the data accesses of the trace file;

building a candidate sequence using the DAG; and if a cost of accessing data in the candidate sequence exceeds a threshold, marking the candidate sequence as a repetitively occurring data access sequence.

16. The system of claim 15, wherein computing the cost comprises multiplying a number of times the candidate sequence is generated using the DAG by a number of data access references in the candidate sequence.

17. The system of claim 13, wherein the software development tool includes a navigation pane configured to display a list of identifiers, wherein each identifier is associated with one of the repetitively occurring data access sequences.

18. The system of claim 17, wherein the navigation pane is further configured to navigate the list of identifiers in response to user input.

19. The system of claim 18, wherein upon selection of one of the identifiers, the software development tool is further configured to display code related to the repetitively occurring data access sequence associated with the selected identifier.

20. A computer-readable medium having computer-executable instructions for providing information about a stream of data accesses, comprising:

displaying a plurality of identifiers, wherein each identifier is associated with a repetitively occurring data access sequence;

upon selection of one of the identifiers, displaying an attribute of the associated data access sequence; and generating a stream flow output that displays the frequency that repetitively occurring data access sequences follow other repetitively occurring data access sequences when non-repetitively data access sequences are ignored.

21. The computer-readable medium of claim 20, where the attribute comprises the number of times the associated data access sequence repeats in the stream.

22. The computer-readable medium of claim 20, wherein the attribute comprises the number of data references in the associated data access sequence.

23. The computer-readable medium of claim 20, wherein the attribute comprises a number of unique objects referenced in the associated data access sequence.

24. The computer-readable medium of claim 20, wherein the attribute comprises a number of references in the stream between occurrences of the data access sequence.

25. The computer-readable medium of claim 20, wherein the attribute shows an efficiency with which the references of a data access sequence are placed in cache blocks.

26. The computer-readable medium of claim 25, wherein the efficiency is calculated by dividing a minimum number of cache blocks in which references of the data access sequence could be placed by an actual number of cache blocks in which references in the data access sequence are placed.

* * * * *